United States Patent
Gupta et al.

(10) Patent No.: US 12,425,916 B2
(45) Date of Patent: Sep. 23, 2025

(54) SYSTEM AND METHOD FOR DETERMINING CONGESTION IN A TELECOMMUNICATION DEPLOYMENT AREA

(71) Applicant: JIO PLATFORMS LIMITED, Ahmedabad (IN)

(72) Inventors: Ajay Kumar Gupta, Pune (IN); Aayush Bhatnagar, Navi Mumbai (IN); Smitesh S Damdoo, Navi Mumbai (IN); Rajeev Gupta, Bandra (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 183 days.

(21) Appl. No.: 18/246,505

(22) PCT Filed: Mar. 28, 2022

(86) PCT No.: PCT/IB2022/052825
§ 371 (c)(1),
(2) Date: Mar. 23, 2023

(87) PCT Pub. No.: WO2022/208304
PCT Pub. Date: Oct. 6, 2022

(65) Prior Publication Data
US 2023/0422090 A1 Dec. 28, 2023

(30) Foreign Application Priority Data
Mar. 31, 2021 (IN) .............................. 202121015427

(51) Int. Cl.
*H04B 17/309* (2015.01)
*H04W 24/08* (2009.01)
*H04W 28/02* (2009.01)

(52) U.S. Cl.
CPC ...... *H04W 28/0284* (2013.01); *H04B 17/309* (2015.01); *H04W 24/08* (2013.01)

(58) Field of Classification Search
CPC ............. H04W 28/0284; H04W 24/08; H04W 28/0289; H04W 28/0231; H04B 17/309;
(Continued)

(56) References Cited

U.S. PATENT DOCUMENTS

2023/0038198 A1* 2/2023 Lewis .................. H04W 24/04

FOREIGN PATENT DOCUMENTS

EP 3598721 A1 1/2020

OTHER PUBLICATIONS

Chmieliauskas, Darius & Gursnys, Darius. (2019). LTE Cell Traffic Grow and Congestion Forecasting. 1-5. 10.1109/eStream.2019. 8732145.
(Continued)

*Primary Examiner* — Fred A Casca
(74) *Attorney, Agent, or Firm* — FINNEGAN, HENDERSON, FARABOW, GARRETT & DUNNER LLP

(57) ABSTRACT

Present disclosure generally relates to wireless communication, more particularly to system and method for determining congestion in telecommunication deployment area. System determines, for pre-defined time interval, cell congestion score of each cell in telecommunication deployment area, based on average throughput value of each cell and/or PRB utilization KPI values of each cell. System collects, from each cell, spatial measurement samples corresponding to voice service session and/or data service session initiated by UE connected to each cell. System spatially maps collected spatial measurement samples to spatial grid of predefined size in area. System determines grid congestion score, by computing weighted average of
(Continued)

sample congestion scores corresponding to individual spatial measurement samples which are mapped to corresponding spatial grid, and determines area congestion score of area, based on grid congestion score, and averaging of cell congestion score and grid congestion score in area. System outputs overall congestion score of area.

12 Claims, 4 Drawing Sheets

(58) Field of Classification Search
CPC ... H04L 47/11; H04L 12/5602; H04L 47/828; H04L 47/822
See application file for complete search history.

(56) References Cited

OTHER PUBLICATIONS

International Search Report from International Appl. No. PCT/IB2022/052825, mailed Jul. 14, 2022.

* cited by examiner

SYSTEM AND METHOD FOR DETERMINING CONGESTION IN A TELECOMMUNICATION DEPLOYMENT AREA

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to wireless communication. More particularly, the present disclosure relates to a system and a method for determining congestion in a telecommunication deployment area.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, due to advent of wireless technologies such as Global System for Mobile Communications (GSM), Enhanced Data rates for GSM Evolution (EDGE), High Speed Packet Access (HSPA), Long term Evolution (LTE), and the like, all communications in a wireless network provide various communication services such as voice, video, data, advertisement, content, messaging, broadcasts, and the like. One example of such a network is the Evolved Universal Terrestrial Radio Access (E-UTRA), which may be a radio access network standard meant to be a replacement of the Universal Mobile Telecommunications System (UMTS) and High-Speed Downlink Packet Access (HSDPA)/High Speed Uplink Packet Access (HSUPA) technologies specified in Third Generation Partnership Project (3GPP) releases 5 and beyond. The E-UTRA may be an air interface of 3GPP's Long Term Evolution (LTE) upgrade path for mobile networks. Unlike HSPA, LTE's E-UTRA may be an entirely new air interface system, unrelated to, and incompatible with a Wideband Code Division Multiple Access (W-CDMA). The W-CDMA may provide higher data rates, lower latency and is optimized for packet data. The UMTS, which is the successor to the GSM technology, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS may also support enhanced 3G data communications protocols, such as High-Speed Packet Access (HSPA), which provides higher data transfer speeds and capacity to associated UMTS networks. With the capacity and higher data transfer speeds, there may be many problems associated with the cells and the optimization of the cells.

Further, in 5G cellular deployment, macro cells, along with various small cells, may be planned to provide coverage and capacity solution across a target area. Hence, inter-site distance may become narrower for the network. Further, a greater number of sites/eNodeBs may be required to mitigate on-going data demand in the emerging network, which creates dense to hyper-dense radio access network in big cities. Congestion may be most common and widespread issue in a telecom deployment deteriorating customer experience over time. Further, congestion may vary geo-spatially across a telecom deployment, and congestion in an area, being part of the existing telecom coverage, primarily depends on geo-spatial density of users and telecom coverage/capacity provisioned for the area. To address congestion issues, network operators may require insights into the congestion level of the underlying area, so that additional capacity and coverage can be provisioned for the area. Conventional methods of congestion computations, in a telecom network, are based on computing the congestion levels at individual network elements. However, the conventional methods may be incapable of computing a realistic congestion score of arbitrary geographical area. This is due to the fact that the area could potentially be served by multiple telecom cells. Further, spatial density of users may vary vastly across different regions of the area.

There is therefore a need for an advancement for determining a realistic congestion in a telecommunication deployment area being part of an existing telecom deployment. This realistic congestion considers the fact that the telecommunication deployment area could potentially be served by multiple telecom cells of heterogenous nature. Therefore, computation of a realistic congestion score would provide telecommunication operators the opportunity to get insights into congestion profile of the telecommunication area under consideration which would therefore enable telecommunication operators with solutions and preventive measures for the telecommunication area in case the congestion score indicates significant deterioration in a heterogeneous network.

OBJECTS OF THE PRESENT DISCLOSURE

Some of the objects of the present disclosure, which at least one embodiment herein satisfies are as listed herein below.

In a general aspect, the present disclosure provides a system and a method for determining congestion in a telecommunication deployment area.

In an aspect, the present disclosure helps telecommunication operators to compute congestion score of a geographical area being covered by respective telecommunication service.

In another aspect, the present disclosure helps telecommunication operators to plan additional telecommunication capacity for the telecommunication area, thereby addressing improving the overall telecommunication experience of the customers operating in the telecommunication area.

In another aspect, the present disclosure helps telecommunication operators to find the congestion as the root cause of a customer complaint raised from a customer operating in confined telecommunication area.

In yet another aspect, the present disclosure helps telecommunication operators to build the time-based congestion profile of a telecommunication deployment area.

In another aspect, the present disclosure provides a system and a method for determining a cell congestion score of each cell in a telecommunication deployment area, based on at least one of an average throughput value of each cell and one or more Physical Resource Block (PRB) utilization Key Performance Indicator (KPI) values of each cell.

In yet another aspect, the present disclosure provides a system and a method for determining area congestion score of the telecommunication deployment area, based on the grid congestion score of the spatial grids determined in the telecommunication deployment area.

In yet another aspect, the present disclosure provides a system and a method for averaging of the cell congestion score and the grid congestion score in the telecommunication deployment area, thereby determining exact/accurate overall congestion score of the telecommunication deployment area.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for determining congestion in a telecommunication deployment area. The system determines, for a pre-defined time interval, a cell congestion score of each cell in a telecommunication deployment area, based on at least one of an average throughput value of each cell and one or more Physical Resource Block (PRB) utilization Key Performance Indicator (KPI) values of each cell. Further, the system collects, from each cell, one or more spatial measurement samples corresponding to at least one of a voice service session and a data service session initiated by a user of a User Equipment (UE) connected to each cell, upon determining the cell congestion score. Furthermore, the system maps spatially, the collected one or more spatial measurement samples to a spatial grid of a predefined size in the telecommunication deployment area. Thereafter, the system determines a grid congestion score, by computing one or more weighted average of a sample congestion scores corresponding to individual spatial measurement samples which are mapped to the corresponding spatial grid. Also, the system determines area congestion score of the telecommunication deployment area, based on the grid congestion score of the spatial grids determined in the telecommunication deployment area, and averaging of the cell congestion score and the grid congestion score in the telecommunication deployment area. Thereafter, the system outputs the overall congestion score of the telecommunication deployment area, based on the determined area congestion score of the telecommunication deployment area.

In another aspect, the present disclosure further provides a method for determining congestion in a telecommunication deployment area. The method includes determining, for a pre-defined time interval, a cell congestion score of each cell in a telecommunication deployment area, based on at least one of an average throughput value of each cell and one or more Physical Resource Block (PRB) utilization Key Performance Indicator (KPI) values of each cell. Further, the method includes collecting, from each cell, one or more spatial measurement samples corresponding to at least one of a voice service session and a data service session initiated by a user of a User Equipment (UE) connected to each cell, upon determining the cell congestion score. Furthermore, the method includes mapping spatially, the collected one or more spatial measurement samples to a spatial grid of a predefined size in the telecommunication deployment area. Thereafter, the method includes determining a grid congestion score, by computing one or more weighted average of a sample congestion scores corresponding to individual spatial measurement samples which are mapped to the corresponding spatial grid. Further, the method includes determining area congestion score of the telecommunication deployment area, based on the grid congestion score of the spatial grids determined in the telecommunication deployment area, and averaging of the cell congestion score and the grid congestion score in the telecommunication deployment area. Furthermore, the method includes outputting the overall congestion score of the telecommunication deployment area, based on the determined area congestion score of the telecommunication deployment area.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
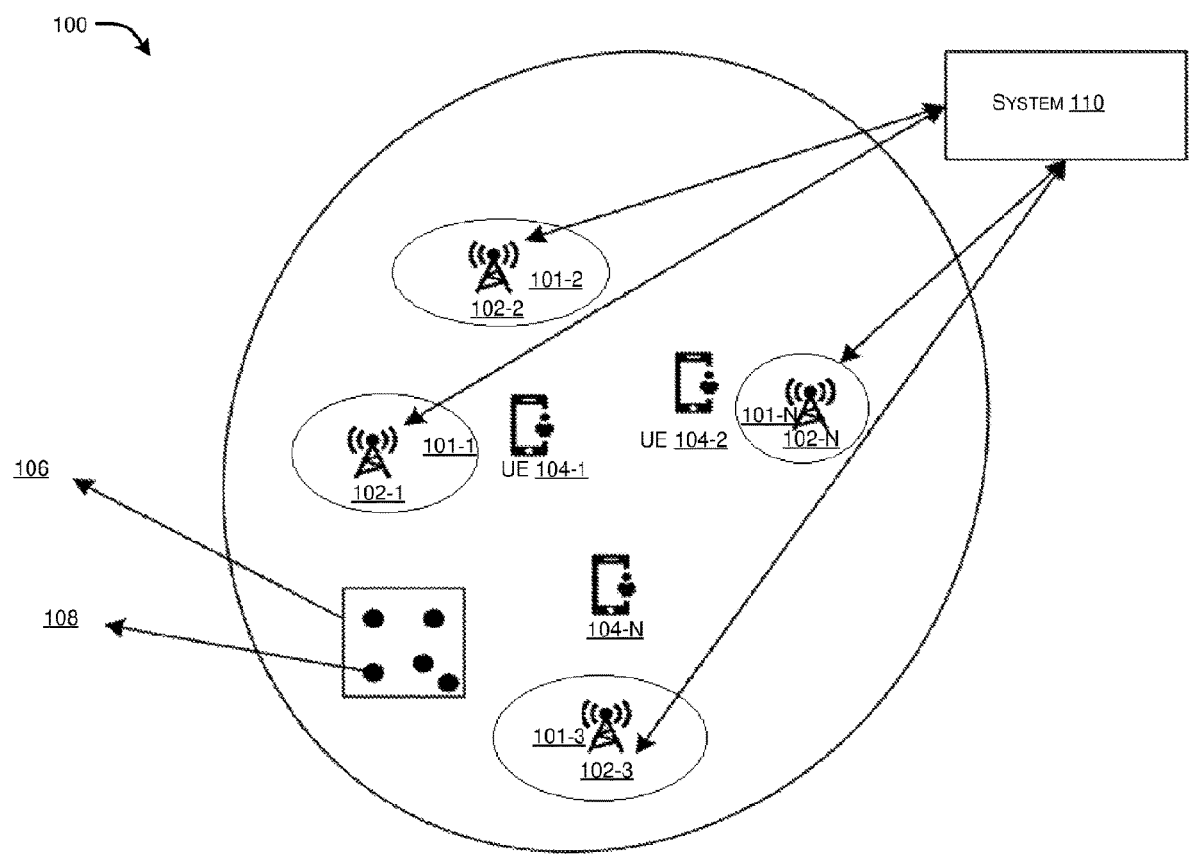
FIG. 1 illustrates an exemplary network architecture in which or with which the system of the present disclosure can be implemented for determining congestion in a telecommunication deployment area, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Various embodiments of the present disclosure provide a system and a method for determining congestion in a telecommunication deployment area. In an aspect, the present disclosure helps telecommunication operators to compute congestion score of a geographical area being covered by respective telecommunication service. In another aspect, the present disclosure helps telecommunication operators to plan additional telecommunication capacity for the telecommunication area, thereby addressing improving the overall telecommunication experience of the customers operating in the telecommunication area. In another aspect, the present disclosure helps telecommunication operators to find the congestion as the root cause of a customer complaint raised from a customer operating in confined telecommunication area. In yet another aspect, the present disclosure helps telecommunication operators to build the time-based congestion profile of a telecommunication deployment area. In another aspect, the present disclosure provides a system and a method for determining a cell congestion score of each cell in a telecommunication deployment area, based on at least one of an average throughput value of each cell and one or more Physical Resource Block (PRB) utilization Key Performance Indicator (KPI) values of each cell. In yet another aspect, the present disclosure provides a system and a method for determining area congestion score of the telecommunication deployment area, based on the grid congestion score of the spatial grids determined in the telecommunication deployment area. In yet another aspect, the present disclosure provides a system and a method for averaging of the cell congestion score and the grid congestion score in the telecommunication deployment area, thereby determining exact/accurate overall congestion score of the telecommunication deployment area.

Referring to FIG. 1 that illustrates an exemplary network architecture for telecommunication congestion determining system (100) (also referred to as network architecture (100)) in which or with which a system (110) of the present disclosure can be implemented, in accordance with an embodiment of the present disclosure. As illustrated, the exemplary network architecture (100) may be equipped with the system (110) for determining congestion in telecommunication deployment area. Further, the network architecture (100) may include cells (101-1, 101-2, 101-3, . . . 101-N) (individually referred to as the cell (101) and collectively referred to as the cells (101)) of cellular towers (102-1, 102-2, 102-3, . . . 102-N) (individually referred to as the cellular tower (102) and collectively referred to as the cellular towers (102)). The cells (101) may include, but are not limited to, macro cells, micro cells, small cells, femtocells, picocells, and the like in the network architecture (100). The cellular towers (102) may include, but are not limited to, Base Station (BS), Mobile Station (MS), Base Station Subsystem (BSS), Base Transceiver Station (BTS), Base Station Controller (BSC), evolve Node B (eNode B), generation Node B (gNode B), and the like. The exemplary network architecture (100) may be an exemplary telecommunication deployment area. The cells (101) may provide wireless service to User Equipment (UE) (104-1, 104-2, 104-3, . . . 104-N) (individually referred to as the User Equipment (UE) (104) and collectively referred to as the User Equipments (UEs) (104)) present in the telecommunication deployment area. In some implementations, the UEs (104) may include, but are not limited to, a handheld wireless communication device (e.g., a mobile phone, a smart phone, a phablet device, and so on); a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, a home appliance device, a home monitoring device, and/or any other type of computer device with wireless communication capabilities, and the like.

Further, each of the cell (101) operating in the telecommunication deployment area may be connected to the system (110), which collects spatial measurement samples (108) corresponding to one or more voice service session or one or more data service session initiated by the UEs (102) by latching on to the cell (101) operating in the telecommunication deployment area. Further, the network architecture (100) may include a spatial grid (106) in the telecommunication deployment area, where the spatial measurement samples (108) are being mapped spatially. The system (110) may collect spatial measurement samples (108) corresponding to particular time interval. The spatial measurement samples (108) may include, but are not limited to, International Mobile Subscriber Identity (IMSI) (e.g., customer identifier), a cell Identity (ID) (e.g., macro cell/micro cell/Wireless-Fidelity (Wi-Fi) identifier), a latitude/longitude (e.g., estimated location of the user), a voice/data flag, a session duration, a Reference Signal Received Power (RSRP) (e.g., signal strength), a Reference Signal Received Quality (RSRQ) (e.g., signal quality), and a Signal to Interference and Noise Ratio (SINR), and the like.

Further, the network architecture (100) or the telecommunication deployment area may include a number of layers (now shown in FIG. 1) including, but are not limited to, a network platform (e.g., servers, databases), network infrastructure (e.g., fiber networks, cellular towers, cable networks, switches), computing devices (e.g., client devices, computers, smartphones, tablets), operating systems, applications (e.g., social network applications, e-commerce applications, third-party applications, operators' applications, carriers' applications), and the like. The network platform may provide content and services to UEs (104) through the network infrastructure and the computing devices. The computing devices may include device hardware (e.g., computers, smartphones, tablets) and may be associated with particular data plans provided by one or more network operators. In particular embodiments, the system (110) may collect data (e.g., application names, application types, time duration, quality of experience, network speed, latency, total amount of data delivered, signal strength, number of connected towers, signal stability status, network coverage, etc.) from the UEs (104) or cellular towers (102). The system (110) may use the collected data for monitoring the network performance, such as, detecting network congestion or coverage problems. The system (110) may provide network insights (e.g., congested areas, congest alerts, coverage alerts, network speeds, network latency, network performance, etc.) based on the collected data for the optimization of the network infrastructure (not shown in FIG. 1). The system (110) may also provide feedback information (e.g., improvements on Quality of Experience (QoE), network speed, latency) for the optimization actions taken on the network infrastructure.

In particular embodiments, the system (110) may monitor the communication network performance (e.g., network traffic congestions, network coverage issues) based on the data from both front-end (e.g., UEs (104), applications, operating system, websites, search engines, and the like) and back-end (e.g., network platform, network infrastructure, servers, switches, database, and the like) of the network architecture (100). In particular embodiments, the system (110) may collect user experience data (e.g., network speeds, network latency, signal stability status) from both front-end and back-end of the network architecture (100). In particular embodiments, the system (110) may use the data collected from the front-end (e.g., applications) to generate optimization recommendations for the back-end network infrastructures or/and network platform. In particular embodiments, the system (110) may use the data collected from the back-end (e.g., network platform, network infrastructure) to generate optimization recommendations for the front-end user experience (e.g., applications, operating system, UEs (104), data plan, network speeds, latency, and the like). In particular embodiments, the system (110) may determine one or more network coverage metrics (e.g., signal strength, number of connected towers, signal stability status) and compare the network coverage metrics to respective threshold values to detect one or more network coverage issues. Further, the system (110) may calculate key network Key Performance Indicators (KPIs) pertaining to each of cell (101).

The system (110) may be further operatively coupled to a computing device associated with an entity (not shown in FIG. 1). The entity may include a company, an organisation, a network operator, a vendor, a university, a lab facility, a business enterprise, a defence facility, or any other secured facility. Further, the entity may analyse the data or output from the system (110). In some implementations, the system (110) may also be associated with the computing device. Further, the system (110) may also be communicatively coupled to the UEs (104) via a communication network of the network architecture (100).

Although FIG. 1 shows exemplary components of the network architecture (100), in other implementations, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

In some implementations, the system (110) may be a standalone device and may be communicatively coupled to the computing device (not shown in FIG. 1) and/or a centralized server (not shown in FIG. 1). In another implementation, the system (110) may be associated with the computing device or the centralized server. The system (110) may be implemented in, but are not limited to, an electronic device, a mobile device, a wireless device, a wired device, a server, and the like. Such server may include, but not limited to, a standalone server, a remote server, a cloud server, dedicated server, and the like.

Figure 2:
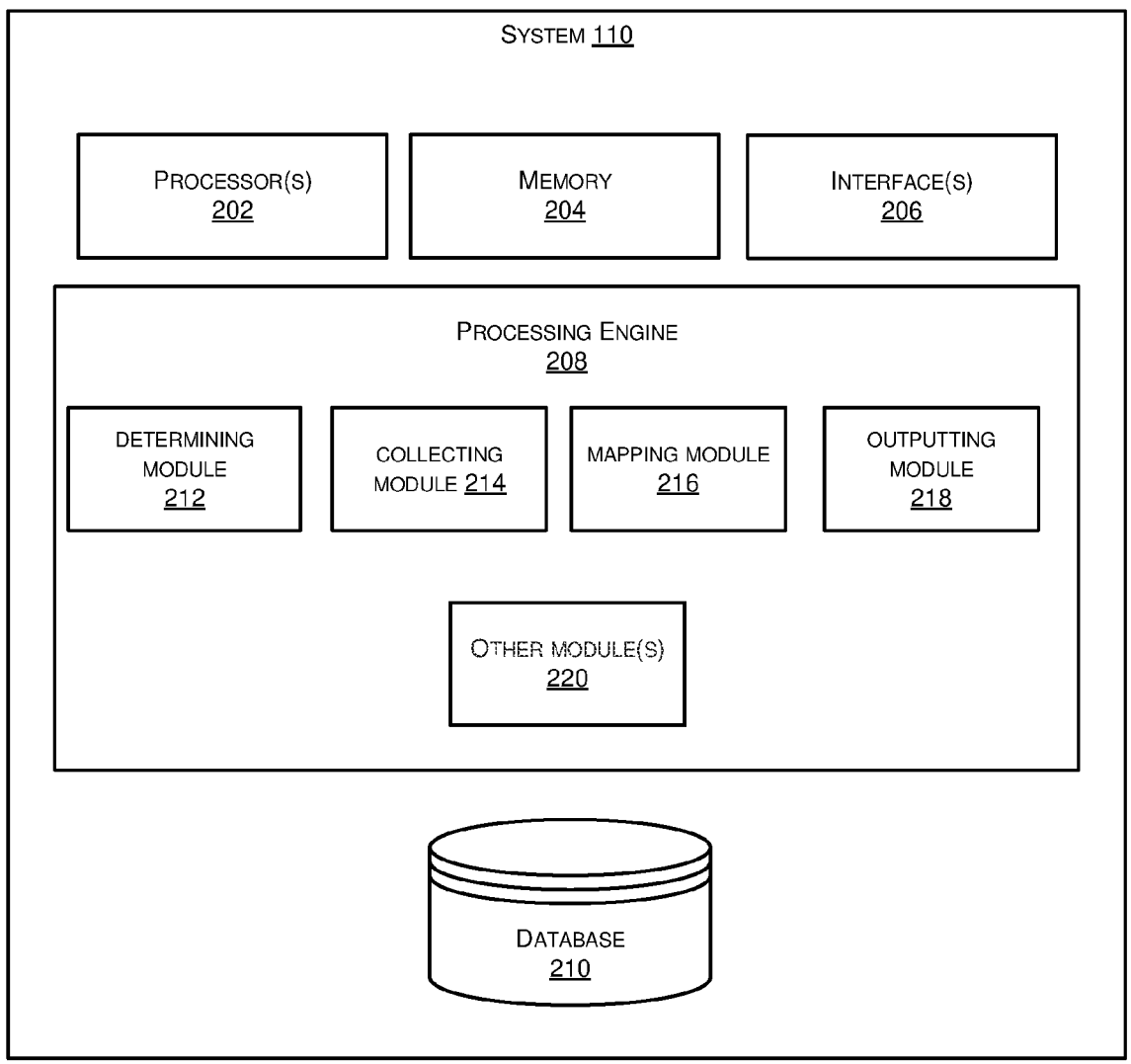
FIG. 2 illustrates an exemplary representation of a system for determining congestion in a telecommunication deployment area, in accordance with an embodiment of the present disclosure.

In an embodiment, the system (110) may include one or more processors coupled with a memory, wherein the memory may store instructions which when executed by the one or more processors may cause the system (110) to perform determination of congestion in the telecommunication deployment area. An exemplary representation of the system (110) for determination of congestion in the telecommunication deployment area, in accordance with an embodiment of the present disclosure, is shown in FIG. 2. In an aspect, the system (110) may include one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) (206). The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may include the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more modules/engines selected from any of a determining module (212), a collecting module (214), a mapping module (216), an outputting module (218), and other module(s) (220). The processing engine (208) may further be edge based micro service event processing, but not limited to the like.

In an embodiment, the determining module (212) may determine, for a pre-defined time interval, a cell congestion score of each cell (101) in a telecommunication deployment area, based on at least one of an average throughput value of each cell (101) and one or more Physical Resource Block (PRB) utilization Key Performance Indicator (KPI) values of each cell (101). In an embodiment, the cell congestion score may be either a single value being determined for the pre-defined time interval as a whole or an array of cell congestion score values where each value corresponds to the cell congestion score determined for one or more sub-intervals of the pre-defined time interval. The sub-interval may be a divided continuous sub-intervals of a whole pre-defined time interval. For instance, the cell congestion score is either a single value being computed for the time interval 'T' as a whole or an array of values where each value corresponds to a cell congestion score computed for the sub-interval of 'T' when a whole-time interval 'T' is divided into continuous sub-intervals with each sub-interval having duration of 'Tsub'.

The cell congestion score may be computed as a discrete value decided on the basis of cell's average throughput and PRB utilization KPI values of each cell (101). For example, the cell congestion score may be '100' if average throughput is less than '512' Kbps and the PRB utilization is more than 70%. Similarly, if the cell congestion score may be '50' if average throughput is between '512' Kbps and '1024' Kbps, and the PRB utilization is more than 70%. Further, the cell congestion score may be '25' if average throughput is between '1024' Kbps and '2048' Kbps, and the PRB utilization is more than 70%. Furthermore, the cell congestion score may be '0' if Average throughput is above '2048' Kbps.

In an embodiment, the collecting module (214) may collect, from each cell (101), one or more spatial measurement samples (108) corresponding to at least one of a voice service session and a data service session initiated by a user of the User Equipment (104) connected to each cell (101), upon determining the cell congestion score. The spatial measurement samples (108) may include, but are not limited to, an International Mobile Subscriber Identity (IMSI), a cell Identity (ID), a latitude/longitude, a voice/data flag, a session duration, a Reference Signal Received Power (RSRP), a Reference Signal Received Quality (RSRQ), a Signal to Interference and Noise Ratio (SINR), and the like.

In an embodiment, the mapping module (216) may map spatially, the collected one or more spatial measurement samples (108) to a spatial grid (106) of a predefined size in the telecommunication deployment area. For instance, each of spatial measurement samples (108) collected for time interval 'T' is mapped to a spatial grid (106) of size 'S' in the telecommunication deployment area. The grid size may be configurable. For instance, the minimum grid size 'S' could be configured as 10 by 10 meters.

In an embodiment, the determining module (212) may determine a grid congestion score, by computing one or more weighted average of a sample congestion scores corresponding to individual spatial measurement samples (108) which are mapped to the corresponding spatial grid (106). In an embodiment, the sample congestion score of each of the sample may be taken as equivalent to the cell congestion score of the corresponding cell (101) computed for the pre-defined time interval, in which the cell being identified from cell identifier from the spatial measurement samples (108). In an embodiment, the one or more weighted average of a sample congestion scores corresponding to individual spatial measurement is calculated as the proportion of sample elapsed time in the pre-defined time interval with respect to total elapsed time in the pre-defined time interval of all the sample mapped to the corresponding spatial grid (106).

In an embodiment, when the cell congestion score of a cell (101) represents the array of cell congestion score values corresponding to one or more sub-intervals of the pre-defined time interval, the sample congestion score corresponding to individual spatial measurement samples (108) may be calculated as the average sum of the array of cell congestion score values of all the sub-intervals which are the part of the sample session duration in the pre-defined time interval. In another aspect, the grid congestion score can be computed as the weighted average of the congestion scores of individual spatial measurement samples (108) mapped to the corresponding grid, the weight being for the each of the sample is calculated as the proportion of sample elapsed time in 'T' with respect to total elapsed time in 'T' of all the sample mapped to the corresponding grid.

In an instance, each of the sample congestion score can be taken as equivalent to the cell congestion score of the corresponding cell (101) computed for the whole-time interval 'T', the cell (101) being identified from the cell identifier from the spatial measurement samples (108). In case, where the cell congestion score represents an array of congestion score values corresponding to sub-intervals in time interval 'T', the sample congestion score may be calculated as the average sum of score values of all those sub-intervals which are the part of the sample session duration in the time interval 'T'.

In an embodiment, the determining module (212) may determine area congestion score of the telecommunication deployment area, based on the grid congestion score of the spatial grids (106) determined in the telecommunication deployment area, and averaging of the cell congestion score and the grid congestion score in the telecommunication deployment area.

In an embodiment, the outputting module (218) may output the overall congestion score of the telecommunication deployment area, based on the determined area congestion score of the telecommunication deployment area.

In an embodiment, the UEs (104) or the computing device (not shown in FIG. 1 and FIG. 2) may communicate with the system (110) via set of executable instructions residing on any operating system, including but not limited to, Android™, iOS™, Kai OS™, and the like. In an embodiment, the UEs (104) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the UEs (104) may not be restricted to the mentioned devices and various other devices may be used. A smart computing device may be one of the appropriate systems for storing data and other private/sensitive information.

Figure 3:
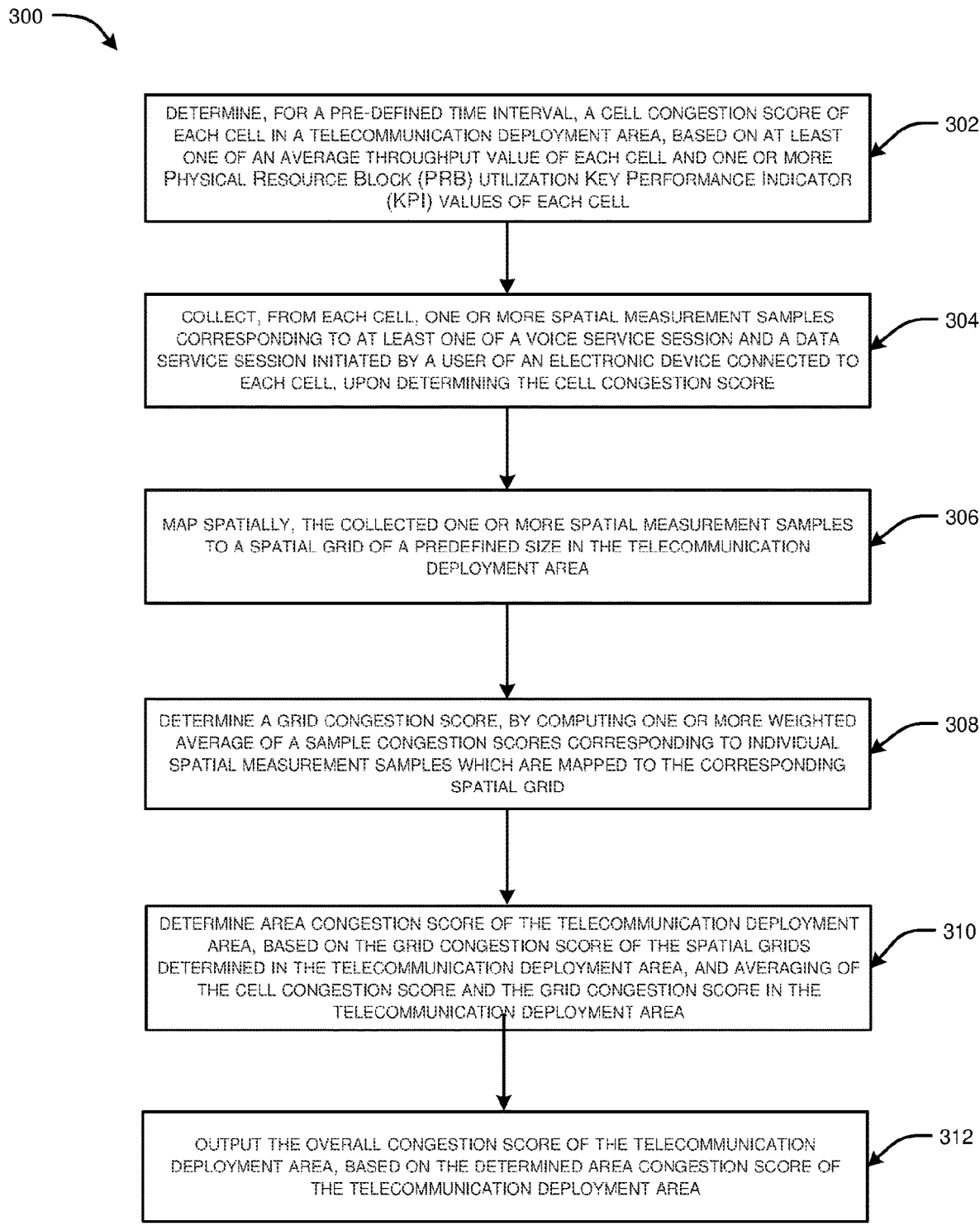
FIG. 3 illustrates exemplary method flow chart depicting a method for determining congestion in a telecommunication deployment area, in accordance with an embodiment of the present disclosure.

FIG. 3 illustrates exemplary method flow chart depicting a method (300) for determining congestion of the telecommunication deployment area, in accordance with an embodiment of the present disclosure.

As illustrated in FIG. 3, the method (300) includes one or more blocks illustrating a method of determining congestion of the telecommunication deployment area. The method (300) may be described in the general context of computer-executable instructions. Generally, computer-executable instructions can include routines, programs, objects, components, data structures, procedures, modules, and functions, which perform functions or implement abstract data types.

The order in which the method (300) is described is not intended to be construed as a limitation, and any number of the described method blocks can be combined in any order to implement the method (300). Additionally, individual blocks may be deleted from the methods without departing from the scope of the subject matter described herein. Furthermore, the method (300) can be implemented in any suitable hardware, software, firmware, or combination thereof.

At block (302), the method (300) may include determining, by the processor (202), for a pre-defined time interval, a cell congestion score of each cell (101) in a telecommunication deployment area, based on at least one of an average throughput value of each cell (101) and one or more Physical Resource Block (PRB) utilization Key Performance Indicator (KPI) values of each cell (101).

At block (304), the method (300) may include collecting, by the processor (202), from each cell (101), one or more spatial measurement samples (108) corresponding to at least one of a voice service session and a data service session initiated by a user of a User Equipment (UE) (104) connected to each cell (101), upon determining the cell congestion score.

At block (306), the method (300) may include mapping spatially, by the processor (202), the collected one or more spatial measurement samples (108) to a spatial grid (106) of a predefined size in the telecommunication deployment area.

At block (308), the method (300) may include determining, by the processor (202), a grid congestion score, by computing one or more weighted average of a sample congestion scores corresponding to individual spatial measurement samples (108) which are mapped to the corresponding spatial grid (106).

At block (310), the method (300) may include determining, by the processor (202), area congestion score of the telecommunication deployment area, based on the grid congestion score of the spatial grids (106) determined in the telecommunication deployment area, and averaging of the cell congestion score and the grid congestion score in the telecommunication deployment area.

At block (312), the method (300) may include outputting, by the processor (202), the overall congestion score of the telecommunication deployment area, based on the determined area congestion score of the telecommunication deployment area.

Figure 4:
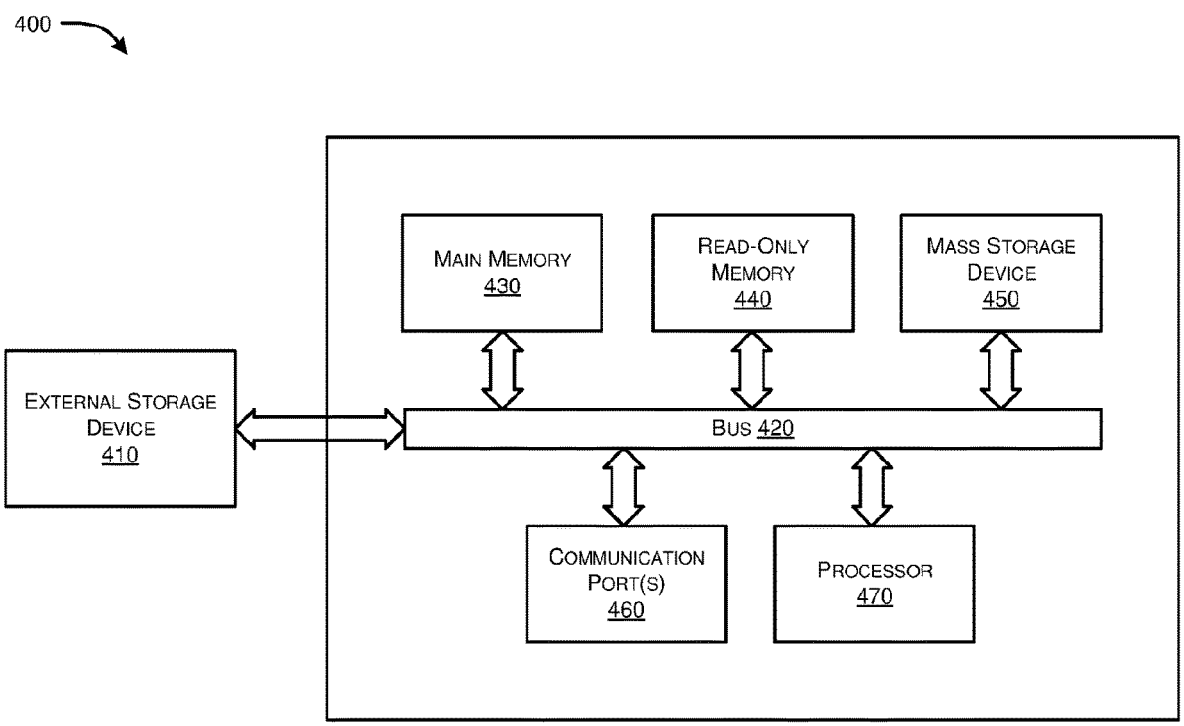
FIG. 4 illustrates an exemplary computer system in which or with which embodiments of the present invention can be utilized, in accordance with embodiments of the present disclosure.

FIG. 4 illustrates an exemplary computer system (400) in which or with which embodiments of the present invention can be utilized, in accordance with embodiments of the present disclosure.

As shown in FIG. 4, computer system (400) can include an external storage device (410), a bus (420), a main memory (430), a read only memory (440), a mass storage device (450), communication port (460), and a processor (470). A person skilled in the art will appreciate that the computer system may include more than one processor and communication ports. Examples of processor (470) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (470) may include various modules associated with embodiments of the present invention. Communication port (460) can be any of an RS-232 port for use with a modem-based dialup connection, a 10/100 Ethernet port, a Gigabit or 10 Gigabit port using copper or fibre, a serial port, a parallel port, or other existing or future ports. Communication port (460) may be chosen depending on a network, such a Local Area Network (LAN), Wide Area Network (WAN), or any network to which computer system connects. Memory (430) can be Random Access Memory (RAM), or any other dynamic storage device commonly known in the art. Read-only memory (440) can be any static storage device(s) e.g., but not limited to, a Programmable Read Only Memory (PROM) chips for storing static information e.g., start-up or BIOS instructions for processor (470). Mass storage (450) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g., those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (420) communicatively couples' processor(s) (470) with the other memory, storage and communication blocks. Bus (420) can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (470) to software system.

Optionally, operator and administrative interfaces, e.g., a display, keyboard, and a cursor control device, may also be coupled to bus (420) to support direct operator interaction with a computer system. Other operator and administrative interfaces can be provided through network connections connected through communication port (460). The external storage device (410) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Various embodiments of the present disclosure provide a system and a method for determining congestion in a telecommunication deployment area. In an aspect, the present disclosure helps telecommunication operators to compute congestion score of a geographical area being covered by respective telecommunication service. In another aspect, the present disclosure helps telecommunication operators to plan additional telecommunication capacity for the telecommunication area, thereby addressing improving the overall telecommunication experience of the customers operating in the telecommunication area. In another aspect, the present disclosure helps telecommunication operators to find the congestion as the root cause of a customer complaint raised from a customer operating in confined telecommunication area. In yet another aspect, the present disclosure helps telecommunication operators to build the time-based congestion profile of a telecommunication deployment area. In another aspect, the present disclosure provides a system and a method for determining a cell congestion score of each cell in a telecommunication deployment area, based on at least one of an average throughput value of each cell and one or more Physical Resource Block (PRB) utilization Key Performance Indicator (KPI) values of each cell. In yet another aspect, the present disclosure provides a system and a method for determining area congestion score of the telecommunication deployment area, based on the grid congestion score of the spatial grids determined in the telecommunication deployment area. In yet another aspect, the present disclosure provides a system and a method for averaging of the cell congestion score and the grid congestion score in the telecommunication deployment area, thereby determining exact/accurate overall congestion score of the telecommunication deployment area.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A system (110) for determining congestion in a telecommunication deployment area, the system (110) comprising:
    a processor (202);
    a memory (204) coupled to the processor (202), wherein the memory (204) comprises processor executable instructions, which on execution, causes the processor (202) to:
        determine, for a pre-defined time interval, a cell congestion score of each cell (101) in a telecommunication deployment area, based on at least one of an average throughput value of each cell (101) and one or more Physical Resource Block (PRB) utilization Key Performance Indicator (KPI) values of each cell (101);
        collect, from each cell (101), one or more spatial measurement samples (108) corresponding to at least one of a voice service session and a data service session initiated by a user of a User Equipment (UE) (104) connected to each cell (101), upon determining the cell congestion score;
        map spatially, the collected one or more spatial measurement samples (108) to a spatial grid (106) of a predefined size in the telecommunication deployment area;
        determine a grid congestion score, by computing one or more weighted average of a sample congestion scores corresponding to individual spatial measurement samples (108) which are mapped to the corresponding spatial grid (106);
        determine area congestion score of the telecommunication deployment area, based on the grid congestion score of the spatial grids (106) determined in the telecommunication deployment area, and averaging of the cell congestion score and the grid congestion score in the telecommunication deployment area; and
        output the overall congestion score of the telecommunication deployment area, based on the determined area congestion score of the telecommunication deployment area.

2. The system (110) as claimed in claim 1, wherein the spatial measurement samples (108) comprise at least one of an International Mobile Subscriber Identity (IMSI), a cell Identity (ID), a latitude/longitude, a voice/data flag, a session duration, a Reference Signal Received Power (RSRP), a Reference Signal Received Quality (RSRQ), and a Signal to Interference and Noise Ratio (SINR).

3. The system (110) as claimed in claim 1, wherein the cell congestion score is either a single value being determined for the pre-defined time interval as a whole or an array of cell congestion score values where each value corresponds to the cell congestion score determined for one or more sub-intervals of the pre-defined time interval, wherein the sub-interval is a divided continuous sub-intervals of a whole pre-defined time interval.

4. The system (110) as claimed in claim 3, wherein, when the cell congestion score of a cell (101) represents the array of cell congestion score values corresponding to one or more sub-intervals of the pre-defined time interval, the sample congestion score corresponding to individual spatial measurement samples (108) is calculated as the average sum of the array of cell congestion score values of all the sub-intervals which are the part of the sample session duration in the pre-defined time interval.

5. The system (110) as claimed in claim 1, wherein the sample congestion score of each of the sample is taken as equivalent to the cell congestion score of the corresponding cell (101) computed for the pre-defined time interval, in which the cell (101) being identified from cell identifier from the spatial measurement samples (108).

6. The system (110) as claimed in claim 1, wherein the one or more weighted average of a sample congestion scores corresponding to individual spatial measurement is calculated as the proportion of sample elapsed time in the pre-defined time interval with respect to total elapsed time in the pre-defined time interval of all the sample mapped to the corresponding spatial grid (106).

7. A method for determining congestion in a telecommunication deployment area, the method comprising:
   determining, by a processor (202), for a pre-defined time interval, a cell congestion score of each cell (101) in a telecommunication deployment area, based on at least one of an average throughput value of each cell (101) and one or more Physical Resource Block (PRB) utilization Key Performance Indicator (KPI) values of each cell (101);
   collecting, by the processor (202), from each cell (101), one or more spatial measurement samples (108) corresponding to at least one of a voice service session and a data service session initiated by a user of a User Equipment (UE) (104) connected to each cell (101), upon determining the cell congestion score;
   mapping spatially, by the processor (202), the collected one or more spatial measurement samples (108) to a spatial grid (106) of a predefined size in the telecommunication deployment area;
   determining, by the processor (202), a grid congestion score, by computing one or more weighted average of a sample congestion scores corresponding to individual spatial measurement samples (108) which are mapped to the corresponding spatial grid (106);
   determining, by the processor (202), area congestion score of the telecommunication deployment area, based on the grid congestion score of the spatial grids (106) determined in the telecommunication deployment area, and averaging of the cell congestion score and the grid congestion score in the telecommunication deployment area; and
   outputting, by the processor (202), the overall congestion score of the telecommunication deployment area, based on the determined area congestion score of the telecommunication deployment area.

8. The method as claimed in claim 7, wherein the spatial measurement samples (108) comprise at least one of an International Mobile Subscriber Identity (IMSI), a cell Identity (ID), a latitude/longitude, a voice/data flag, a session duration, a Reference Signal Received Power (RSRP), a Reference Signal Received Quality (RSRQ), and a Signal to Interference and Noise Ratio (SINR).

9. The method as claimed in claim 7, wherein the cell congestion score is either a single value being determined for the pre-defined time interval as a whole or an array of cell congestion score values where each value corresponds to the cell congestion score determined for one or more sub-intervals of the pre-defined time interval, wherein the sub-interval is a divided continuous sub-intervals of a whole pre-defined time interval.

10. The method as claimed in claim 9, wherein, when the cell congestion score of a cell (101) represents the array of cell congestion score values corresponding to one or more sub-intervals of the pre-defined time interval, the sample congestion score corresponding to individual spatial measurement samples (108) is calculated as the average sum of the array of cell congestion score values of all the sub-intervals which are the part of the sample session duration in the pre-defined time interval.

11. The method as claimed in claim 7, wherein the sample congestion score of each of the sample is taken as equivalent to the cell congestion score of the corresponding cell (101) computed for the pre-defined time interval, in which the cell (101) being identified from cell identifier from the spatial measurement samples (108).

12. The method as claimed in claim 7, wherein the one or more weighted average of a sample congestion scores corresponding to individual spatial measurement is calculated as the proportion of sample elapsed time in the pre-defined time interval with respect to total elapsed time in the pre-defined time interval of all the sample mapped to the corresponding spatial grid (106).

* * * * *